(12) United States Patent
Katz et al.

(10) Patent No.: US 6,343,086 B1
(45) Date of Patent: *Jan. 29, 2002

(54) GLOBAL PACKET-SWITCHED COMPUTER NETWORK TELEPHONY SERVER

(75) Inventors: Michael Katz, Westford; Dan Daly, Holbrook; Paul Kerr, Natick; R. Brough Turner, Newton Corner; Wendell Bishop, Somerville, all of MA (US); Julius Rothschild, Des Plains; Adam Machalek, Lake In The Hills, both of IL (US)

(73) Assignee: Natural MicroSystems Corporation, Framingham, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/926,811

(22) Filed: Sep. 9, 1997

Related U.S. Application Data

(60) Provisional application No. 60/025,978, filed on Sep. 9, 1996, and provisional application No. 60/028,135, filed on Oct. 15, 1996.

(51) Int. Cl.⁷ .............................. H04L 12/66; H04J 3/24; H04M 7/00; H04M 3/00
(52) U.S. Cl. ........................ 370/489; 370/352; 370/356; 370/473; 370/474; 379/225; 379/229; 379/242
(58) Field of Search ................................. 370/352, 354, 370/356, 401, 466, 400, 389, 392, 473, 474; 379/93.05, 67, 229, 242, 225

(56) References Cited

U.S. PATENT DOCUMENTS

| | | | | |
|---|---|---|---|---|
| 3,922,497 A | * | 11/1975 | Artom et al. | 370/401 |
| 5,093,827 A | * | 3/1992 | Franklin et al. | 370/60.1 |
| 5,410,542 A | * | 4/1995 | Gerbehy et al. | 370/85.1 |
| 5,521,914 A | * | 5/1996 | Mavraganis et al. | 370/60 |
| 5,649,005 A | * | 7/1997 | Lynch et al. | 379/242 |
| 5,673,399 A | * | 9/1997 | Guthrie et al. | 395/308 |
| 5,841,842 A | * | 11/1998 | Baum et al. | 379/93.32 |
| 5,875,234 A | * | 2/1999 | Clayton et al. | 379/93.05 |
| 5,892,764 A | * | 4/1999 | Riemann et al. | 370/401 |
| 6,067,595 A | * | 5/2000 | Lindenstruth | 710/129 |

* cited by examiner

Primary Examiner—Wellington Chin
Assistant Examiner—M. Phan
(74) Attorney, Agent, or Firm—Mintz, Levin, Cohn, Ferris, Glovsky and Popeo, P.C.

(57) ABSTRACT

A system for connecting telephony equipment to computer network equipment includes a telephony interface module adapted to accept at least one telephony connection from a telephony network. A computer network interface module is adapted to accept at least one data connection from a computer network. A signal processing module is adapted to alter data to be transferred between the computer network interface module and the telephony interface module. A bypass mechanism is adapted to transfer data between the telephony interface module, the computer network interface module, and the signal processing module while bypassing a host processor connected to the telephony interface module, the computer network interface module, and the signal processing module.

28 Claims, 3 Drawing Sheets

GLOBAL PACKET-SWITCHED COMPUTER NETWORK TELEPHONY SERVER

CROSS-REFERENCE TO RELATED APPLICATIONS

This application claims the benefit under 35 U.S.C. §119 (e) of provisional application No. 60/025,978, filed Sep. 9, 1996, and provisional application No. 60/028,135, filed Oct. 15, 1996, which are herein incorporated by reference.

BACKGROUND OF THE INVENTION

1. Field of the Invention

The present invention relates generally to a system for interfacing a global packet-switched computer network telephony system with a traditional telephony system and providing a variety of services to either or both networks. The system is able to both place and receive calls on the computer network such as the Internet and on a Public Switched Telephone Network (PSTN). The system is further able to handle multiple call channels and provides for scaleability without reduced performance.

2. Description of the Relevant Art

Computer networked telephony client software exists which uses the memory and central processing unit (CPU) of a personal computer (PC) to compress data received from a user in the form of voice signals and transfer the data over the computer network to a receiving computer. Such software can be used to make telephony connections over packet-switched networks such as the Internet as shown in prior art FIG. 1. An example of such a PC to PC client calling software package would be Microsoft Corporations' Net Meeting software package.

Standard telephony hardware products make use of a Time Division Multiplexing (TDM) bus to transfer many calls over a telephony trunk or telephony bus. Computer telephony hardware may use a bus for handling call channels which runs a protocol such as the Multi-Vendor Integration Protocol (MVIP). MVIP is an open, non-proprietary family of protocol standards for manipulating telephone traffic in a computer environment. Complete information on MVIP protocols and MVIP bus information can be found in the MVIP Specification in "Multi-Vendor Integration Protocol, MVIP-90 Standard Release 1.1" published in 1994 and "Multi-Vendor Integration Protocol, H-MVIP Standard Release 1.0" published in 1995 by GO-MVIP, Inc.—The Global Organization for Multi-Vendor Integration Protocol, as well as in "The MVIP Book—The Definitive Reference Manual for the Multi-Vendor Integration Protocol" written by GO-MVIP, Inc. and published by Flatiron Publishing, Inc., ISBN #0-936648-76-7, as well as, "Multi-Vendor Integration Protocol, MVIP-95 Standard Release Device Driver Standard Release 1.0", published in 1996. All of these references are incorporated herein by reference.

As shown in FIG. 1, Ethernet network interface cards (NIC's) 14, and other network devices 15–17 can be connected to the internal bus 18 in a personal computer (PC)-based call processing computer that makes use of compression schemes in the host PC processor 11 and PC memory 12. Such a system can accept calls from one card, pass the data to PC memory 12, where the host PC processor 11 can perform manipulation of the data as needed. This data flow is shown by the PC bus 18 and arrows in FIG. 1. Some implementations utilize separate digital signal processing (DSP) cards for compression, but still pass the telephone calls' data streams through the host computer's memory and CPU. In all examples, the signals must pass through the host processor and/or memory of the PC at least once.

Since a computer networked telephony system, as described above, requires the use of substantial processing power and memory of the primary computer, the capacity of these implementations is limited by maximum processing power and memory requirements. Since the personal computer is usually augmented with interfaces to a computer network such as the Internet and to a traditional telephone network, software running on the host computer processor processes the data which must pass through the host processor and its main memory. Furthermore, the host processor must also encode and decode speech, convert coded speech packets for transmission over the Internet, as well as un-convert received packets into voice signals. All of this processing can result in data being batched for transmission through the host processor and memory, and limits the number of multiple channels being open at any one time. Furthermore, buffering is needed in memory during encoding and decoding which can cause delays or loss of speech data and can create a noticeable effect on the live telephone conversation between a telephony link and computer network.

SUMMARY OF THE INVENTION

In accordance with the illustrated preferred embodiment of FIG. 2, the present invention provides a method and apparatus which removes the delay and host processor bottlenecks which are present in prior art devices. In the present invention, an architecture is disclosed that supports the entire process of processing and connection of telephony networks and computer networks on attached modules that are controlled by the host computer processor, but which do not require data streams to flow through the host computer processing unit or its associated memory.

In another aspect of the present invention, modules can be added and removed from the system to provide for scalability. This is because the present invention's architecture provides for low delay, scalable transmission of data streams independent of the host computer's processor. More specifically, multiple entering connections from a computer network interface and a telephony interface are handled independently of the host processor and memory and are routed over an alternative bus between processing stages or boards. This provides the advantage that the burden of call processing and encoding/decoding is shifted to the present invention's architecture of modules consisting of hardware and software connected via a separate bus.

DETAILED DESCRIPTION OF THE PREFERRED EMBODIMENT

From the above description, it is apparent that the invention disclosed herein provides a novel and advantageous apparatus and method for handling the inter-operation of global packet-switched computer network (such as Internet) telephony and traditional telephony systems.

The use of commodity computer technology such as personal computers (PC's) forms a base for the addition of the separate modules that form the present invention's architecture. Common personal computers support plug-in modules having additional functions such as modems, faxes, and interfaces to Local and Wide Area Networks (LANS/WANS). The present invention uses boards or add-on cards and serves to handle the data communications load formerly routed through the main CPU in the prior art. Through the use of fast, hardware-based data routing, telephony data streams can bypass the host computer's processor and memory which can be reserved for other tasks.

Figure 2:
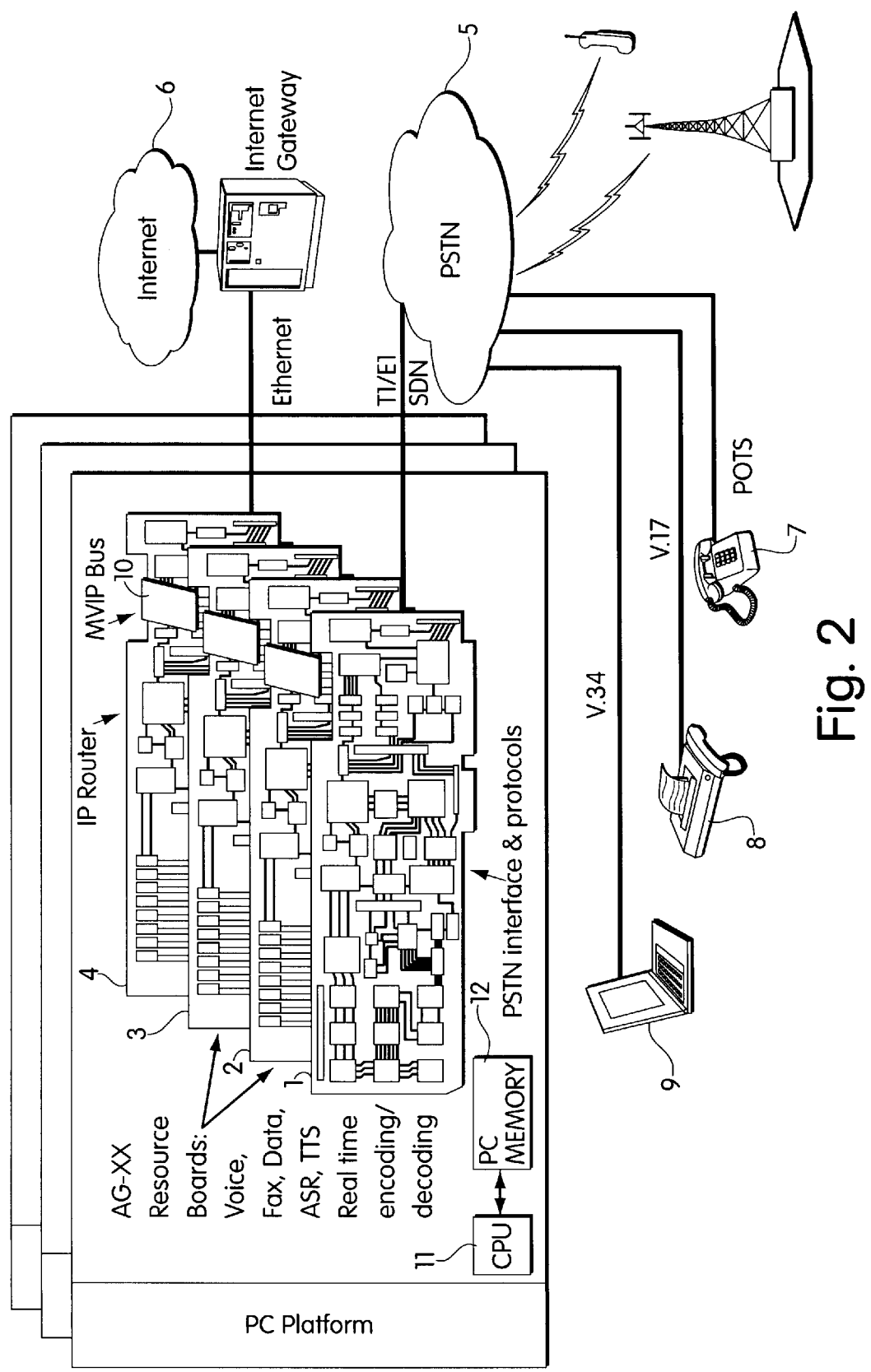
FIG. 2 shows a first embodiment of the present invention providing connections between a Public Switched Telephone Network and a computer network.

In a first embodiment of the present invention, as shown in FIG. 2, a plurality of boards 1–4 plug into a personal computer (not shown). Description of the present invention will be made first by describing a telephony to computer network (Internet) data communications path. Telephony speech or signals originating from one or more of sources 7–9 on a Public Switched Telephone Network (PSTN) enters the system of the present invention through a telephone trunk interface board 1. An example of such a board which can be used would be a T1 interface board, but the present invention is not limited to this type of interface. In the T1 board example, the board can handle up to 24 simultaneous, full-duplex call channels. The Alliance Generation-T1 (AG/T1) interface board produced by Natural Microsystems, Natick, Mass., USA is an example of such a board. Other possible choices of interfaces available could be known E1 or ISDN interface boards. The T1 telephone trunk interface board 1 handles all of the signaling and other issues associated with connecting to the PSTN.

In this example embodiment of the present invention, an MVIP bus 10 connects the T1 board with an associated vocoder board 2, via a separate MVIP interface atop the T1 board, using a separate MVIP bus 10 connection cable adapter. The MVIP interface and adapter cable are used, with MVIP bus switching in the hardware between the T1 board 1, and the vocoder board 2, to transfer many 64 Kbps channels (e.g.:voice channels containing speech) from the PSTN T1 connection to the Digital Signal Processor (DSP) based vocoder resource board 2. The DSP based vocoder board accepts the channels over the MVIP interface, and proceeds to operate on the signals of the channels, as will be explained. The Alliance Generation—AG24 board produced by Natural MicroSystems, Natick, Mass., U.S.A. is an example of such a board.

There can be a varying number of these DSP vocoder boards in place to handle more DSP functions as needed. In the figure, the vocoder boards 2 and 3, for example, function to compress the speech and remove or compress silent periods within the speech. The vocoder boards can use speech compression algorithms which are appropriate for the destination terminal capabilities for each voice channel. For instance, if modem signals are being passed on a channel, then different compressions algorithm can be utilized. In the present example, the compressed speech within the vocoder board, which now requires less that the 64 Kbps channel transmission capacity, is batched and framed for transmission on the MVIP N×64 Kbps inter-board telephony bus, or an equivalent. As an example, the well known GSM speech coding algorithm for voice coding may be used to compress a 64 Kbps channel down to about 13 Kbps, and then High Level Data Link Control (HDLC) framing can be used to frame the compressed speech data in the DSP firmware on the vocoder boards. Other types of compression algorithms may be used, such as True-Speech compression from DSP Group Inc. Other types of framing may be performed as well, such as Transcoder Rate Adapter Unit (TRAU) coding.

Compressed and framed speech is then passed across the MVIP bus, according to the MVIP standard, from the vocoder boards to the network interface board 4 which can be a Local Area Network (LAN) or Wide Area Network (WAN) intranet or Internet interface board. An example of such a board is the NMS/TEKnique TX2000 communications processor manufactured by Natural MicroSystems of Natick, Mass., U.S.A. Note also that the framing and unframing of the compressed speech, HDLC framing in this example, can also be performed within the internal interfaces of the communications processor on the network interface board 4. The network interface board 4 needs to be able to perform HDLC framing/unframing since it will receive the compressed speech frames from the vocoder board and will be providing speech channels to the vocoder boards in the opposite direction as well, since the channels are usually full duplex. In the network interface board 4, the framed speech is formed into packets appropriate for the network for which it is destined for and is sent out onto the computer network. In this example, the packets would be sent onto the Internet, or other network, which may be a Local Area Network. Packets may be in the form described in "MVIPP: A Proposal Standard for the Transport of Packets Over MVIP", written by Wendell Bishop, Julius Rothschild and Adam Machalek, which is herein incorporated by reference. A substantial portion of this document is also incorporated at the end of this application.

Figure 1:
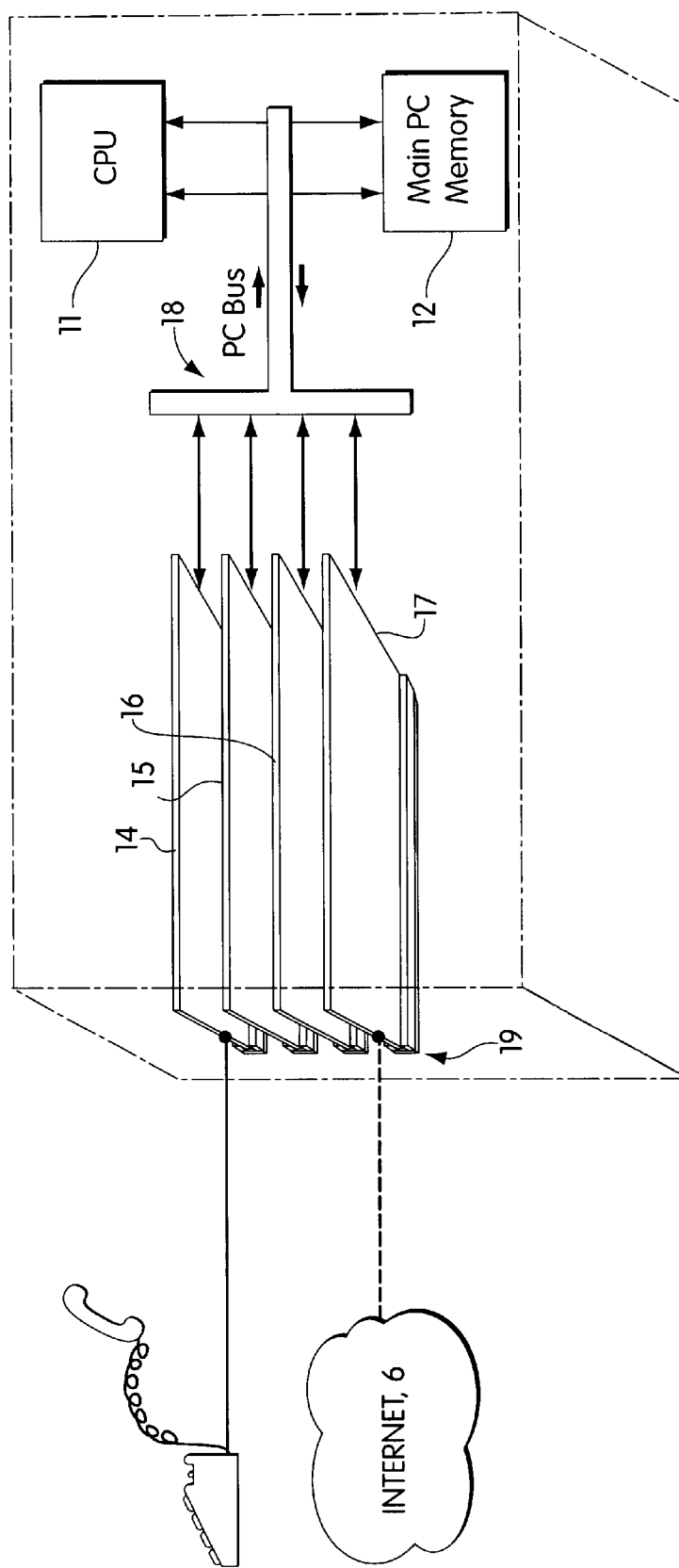
FIG. 1 shows a diagram of the path of data from a phone handset into the PC, through the CPU and memory of the PC, and out of the PC onto the Internet, as provided in the related art.

By framing the speech from the telephone trunk interface board 1, the main host processor 11, memory 12, and main computer bus of the chassis PC, can be bypassed and it can be passed over the telephony oriented inter-board connections via the MVIP bus connecting the boards themselves. Another available bypass mechanism for passing the telephony data across the boards 1–4 would be to use the PCI bus on the PC chassis. Use of a PCI bus would allow one board to be a PCI bus master and would communicate with the other boards without using the main computers' host memory or processor. This variation of the main embodiment of the present invention could use the PCI bus, instead of the MVIP bus, to divert the packets between the boards by tunneling onto the PCI bus and bypassing the host processor and host memory. Yet another available bypass mechanism for passing speech or other telephony data across boards 1–4 would be to use a PC-ATM (Asynchronous Transfer Mode) Bus, such as the one described in "PC-ATM Bus Standard, Revision 1.0" published in 1996 by GO-MVIP, Inc., which is incorporated herein by reference. By using a dedicated hardware path between the boards 1–4 in FIG. 1, the processing and communications load on the host computer and memory is minimized. Furthermore, using a path between the boards themselves allows the system to be scaled to handle many simultaneous channels of interconnection and can improve the speed of individual channel data rates. In general, speech in the other direction (Internet to PSTN), as will be described, passes through the same stages, but in the opposite direction.

In another embodiment of the present invention, connection to a destination on the PSTN 5 from a client (not shown) on the computer network such as the Internet 6 can be handled in the reverse order as described above for the PSTN to computer network/Internet connection. In the example, packet data entering the network interface board 4 from the Internet is framed via HDLC and sent via the MVIP bus to the vocoder boards. The vocoder boards(s) perform the reverse process as described above when the channels were described going from the PSTN to the Internet. At the vocoder boards, the data streams would be decompressed and transferred to the telephone trunk interface board 1 again via the MVIP bus located between the boards 1–4. During all of this processing, the data stream of the full-duplex channels and the processing involved for decompression and de-packetization of the Internet packets would be isolated from the host processor. After the data is sent to the T1 board, call setup may be handled and the connection to the PSTN is made.

Another feature of the present invention's use of a bus between the boards 1–4, such as an MVIP bus, is that not only many 64 Kbps data streams are supported, but also data streams operating at other data rates may be supported in the system. For example, if other data channels that are not multiples of 64 bits need to be passed over a connection, a slower data rate channel could be used. Other data streams operating on the MVIP bus and within the boards 1–4 could be data streams consisting of compressed voice information which is sent in real-time with low-latency, by dividing the data stream into framed HDLC blocks. Still other data streams containing V.34 modem signaling, and V.17 fax signaling could be transferred between the PSTN and the Internet packet switched network. Thus, the architecture of the present invention can be used to pass modem signaling data between a computer network and a telephone network as will be discussed.

For instance, V.34 modem signaling on the telephone network is represented as 64 Kbps digital representation of an analog modem telephone signal. This enters the T1 board and is framed and passed directly to the DSP board via the MVIP bus. Since a normal modem would have to extract the 28.8 Kbps from the analog modem signal, the present invention's use of a DSP board can perform this transformation. In that event, the data at 28.8 Kbps can be HDLC framed and sent over the MVIP bus to the network interface card for transmission to the computer network. The DSP board accepting the data from the MVIP bus sent from the T1 board would extract the 28.8 Kbps data, then frame this data, and pass the framed data onto the MVIP bus to the network interface card. An example of the network interface card would be a TX/2000 board produced by Natural Micro-Systems of Natick, Mass., USA. Note again that the use of the MVIP bus allows multiple, simultaneous modem channels to be handled in a scalable manner and speeds the communications process and frees up the host CPU and memory.

In another embodiment of the present invention, the network interface board connected to the architecture via the MVIP bus could run a version of the Serial Line Interface Protocol (SLIP) or the Point to Point Protocol (PPP) for each communications channel to handle connections to computers using these methods of communications.

Figure 3:
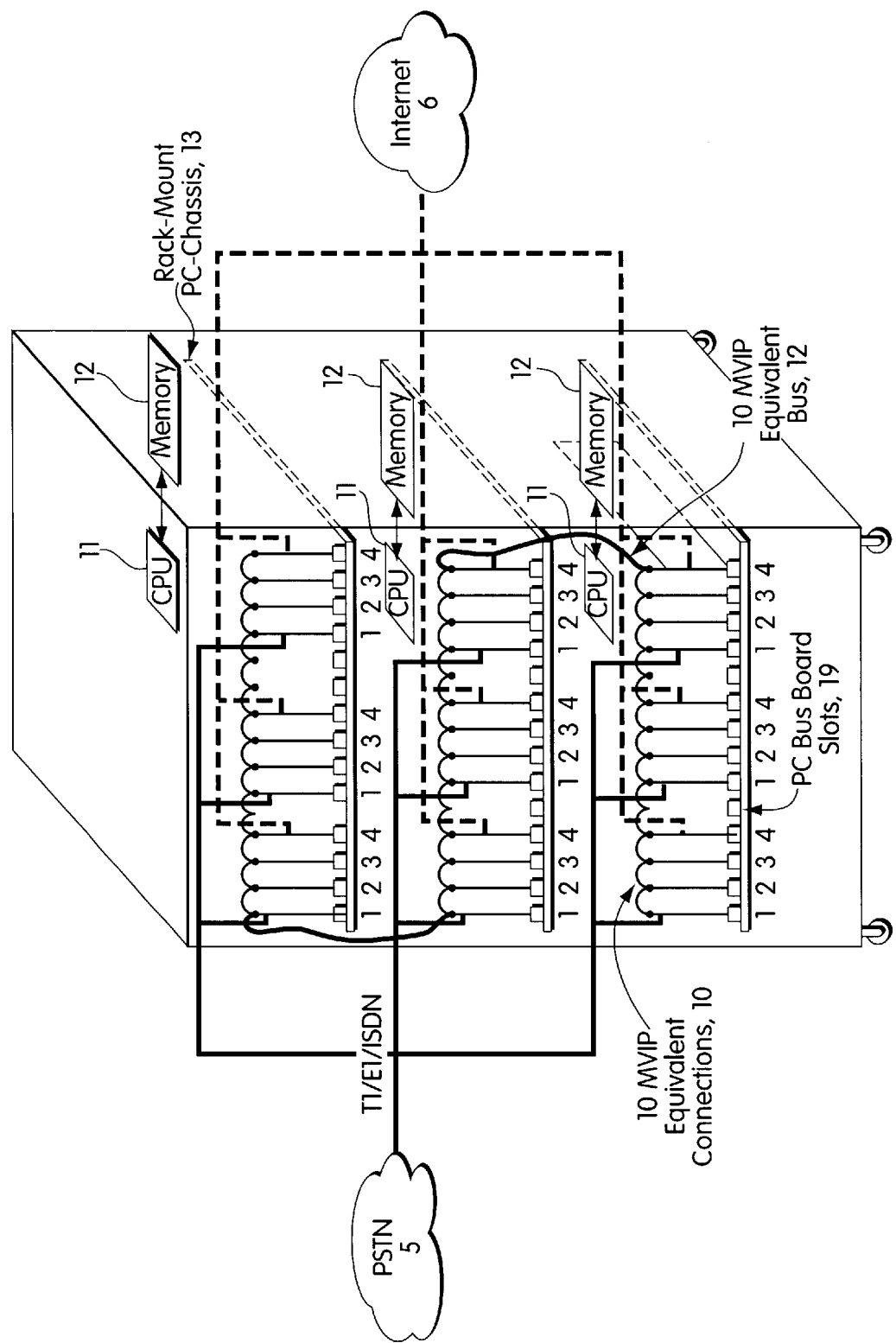
FIG. 3 shows a plurality of clusters of PSTN to computer network board sets, all connected via a bus in a rack mounted chassis or system.

In still another embodiment of the present invention as shown in FIG. 3, a multi-chassis computer system could be implemented to hold many PC chassis 13 with large numbers of board slots 19 for each chassis. The boards described for use in the architecture of the present invention can be connected via a bus, such as the MVIP bus 10 shown in FIG. 3, which bypasses the host CPU 11 and memory 12. Many sets of these boards 1–4, all connected via an MVIP bus 10, placed in the PC-chassis 13 in a rack mounted configuration, as shown in FIG. 3, could create a switching center system for handling many connections between PSTN's and computer networks. An advantage of such an architecture is that each PC host chassis 13 which mounts the architecture of the present invention can handle large amounts of channels since each host CPU 11 and memory 12 does not perform the functions of the sets of boards 1–4 connected by the MVIP bus 10. Thus, complete scalability exists. Furthermore, MVIP provides a group of standards which allows different hierarchical levels of switching. Thus, in the first disclosed embodiment of the present invention, with just three boards (the PSTN T1 connection, one or more vocoder boards, and a network interface card, all attached via the MVIP bus), a set of channels could be handled within the set of three boards. In this embodiment, using MVIP's hierarchial standards for bus configurations, one set of boards could be attached to other sets of boards in the same, or a different PC chassis. Since MVIP is a time division multiplexed bus, if an incoming PSTN channel needs to be switched to a computer network connection which is not in connection with the network interface card associated with the incoming PSTN call, the channel can be switched via the MVIP bus to another set of boards which had a connection to the computer network which the original incoming PSTN channel is destined for. Since MVIP provides for multi-chassis connection, channels can be clustered and switched between chassis. Channels could also be connected together on both the computer network side and the PSTN side for a conference call effect. That is, telephone calls going between computer networks and PSTN's, and vice versa, can be switched between any of the sets of boards, over the MVIP bus, while bypassing the processing of the host CPU of each chassis, according to the architecture of the present invention. Thus, since the present invention relieves the host CPU from the channel processing, scalability is infinite and many sets of boards providing the aforementioned functions can be linked via a bus in and between chassis to provide for a computer network to telephone network switching center and vice versa.

The following passages discuss a particular proposal for the transport of packets over the MVIP bus, which can be used in connection with aspects of the invention.

1. This proposal is in response to a perceived need for MVIP equipment vendors to exchange packet data as well as traditional circuit switched data. The goal is to provide a minimal set of requirements that permit interworking for packet exchange. These requirements are framed as an overlay standard to MVIP-95 and HMVIP which are considered prerequisites. Vendors conforming to these requirements should need no further knowledge of equipment from other similar vendors to ensure that packets can be successfully exchanged. The payload of the packets, and connection setup beyond MVIP switching, are not to be addressed by this standard, permitting vendors considerable freedom in implementing advanced and proprietary features. While the descriptions in this proposal refer mostly to implementations within a single platform, the standard proposed here applies to any of the multi-chassis MVIP standards as well, such as MVIP-MC1, for passing packets between platforms.

Sections 3 through 5 below are to be taken as requirements that are to be followed by any vendor who conforms to the standard. Section 6 and 7 are suggestions that might assist vendors in their implementations.

2. Overview

A review of the application level needs for packet transport will help keep the standard focused on only those aspects that need to be specified. The following four possible application scenarios may be considered.

One interconnection problem arises when there is a need for circuit switched streams which are not multiples of the 64 kbps data rate of an MVIP timeslot. Substrate streams which instead are multiples of 8 kbps may still effectively be handled by using a fixed subset of the 8 bits in each byte of a 64 kbps stream. However, constant data streams which are not multiples of 8 kbps, or variable rate streams, must have other means of identifying which bits of the 64 kbps streams are to be used. A packet protocol permits streams of any, including variable, data rate to be transported. Note that there may be need to support such streams at greater than the 64 kbps data rate of a single MVIP timeslot.

The requirement to transport traditional circuit traffic over the Internet and intranets has created a market for gateway products that bridge between real time telephony media streams and IP networks. In low port count, say workstation, environments, the host processor bus can satisfactorily move such data. In high port count server environments, however, the host bus can be overloaded or may be required for other activities. The low latency requirements of such gateways make MVIP an ideal transport medium.

Some vendors prefer to control their traditional circuit switched computer telephony equipment with a packet bus rather than with host software over the host processor bus. The advantages of such an approach include easier support of multiple operating systems, and an easy way to extend systems to multiple boxes. A packet transport standard over MVIP makes it easier for such vendors to open their control channels for integration with the products of other vendors. But the variety of uses for these control channels argues against standardizing the control information itself. Vendors can open their systems by simply publishing the payload standard which defines the control information carried with the MVIP packet standard.

Each of the first three application scenarios above implies a system based on traditional circuit switched equipment likely coming from existing MVIP vendors. Packet switching systems have traditionally had needs not satisfied by MVIP, but a packet standard over MVIP could help two packet board vendors integrate their products. While this would likely not be cost effective in competing with dedicated packet routing equipment, there may be special applications which make this viable. And packet systems will soon need to support guaranteed bandwidth and latency for which the predictable delays over MVIP may prove to be a considerable advantage.

A packet standard over MVIP is analogous to packet transport over the public long distance networks, albeit at a very different scale. A long distance carrier may dedicate a Sonet link as a TCP/IP backbone. At the lowest layer, Sonet is partitioned into many 64 kbps circuits. But in such an application, they are all bonded together to provide raw bandwidth for the packets. The packet routing is provided by dedicated servers at various nodes, but is not visible at the Sonet link layer. In a similar fashion, a packet standard over MVIP can focus on providing raw bandwidth over fixed links, and leave issues of routing to the nodes or individual boards at the ends of those links, outside the standard.

This proposed packet standard primarily addresses a simplex MVIP connection—packets moving from a source device to a destination device. Duplex connections are to consist of two simplex connections. Broadcast is also permitted; a single source device may produce packets on a packet channel which are received by more than one destination device. However, any operations involving multiplexing or demultiplexing packets from a single channel are to be handled outside the standard. In particular, routing based on the IP address of the IP packet is a function of the end device, and not further specified by the standard.

The smallest packet channel uses a single MVIP timeslot of 64 kbps; subrate channels for packets are not supported. Devices may support packet channels in any integral multiple of 64 kbps up to a full MVIP bus stream. Where multiple timeslots are to be used, all timeslots are to be consecutive on a single MVIP stream and sequenced by timeslot number in composing the packet channel byte stream. In making the packet channel connections, all MVIP switch connections through a single MVIP switch must be established with a single SET_OUTPUT command using FRAMED mode. It is recommended that any device supporting multiple timeslots be able to support any integral number less than the supported maximum number of timeslots in order to better find a match with other devices. A device which uses a packet channel of only 64 kbps may have an MVIP switch which does not support FRAMED mode. A resource device with no MVIP switch may support a packet channel of multiple timeslots having all timeslots nailed up to the MVIP bus. When a packet device is said to conform to the MVIP packet standard, additional documentation with the device must give the MVIP switch model (if any) and identify the timeslots to be used by the packet channel(s).

A given packet channel may choose to operate using one of three alternate protocols spelled out in section 5 below. The same protocol must be used for the duration of a packet channel connection; protocol types may not be mixed on the same channel. All protocols are HDLC based with slight differences in the way that payload data is to be wrapped. A quick summary of the three types is given here.

The first protocol type defines the simplest possible HDLC framing to move a packet from point to point (one packet device to another). This raw HDLC frame could be used to satisfy any of the above application needs. This type requires the least support hardware and no error detection, and it is intended for use only over highly reliable MVIP bus transport.

The second protocol type adds some simple addressing to an HDLC frame to permit a single packet channel to carry multiple logical sub-channels. When used point to point, this permits single HDLC hardware devices for the single packet channel to carry the information for many independent media streams. When used in broadcast mode over the MVIP bus, the addressing permits each of multiple destination devices to extract only those packets specifically destined for them. A control protocol associated with this second protocol type is established for call setup purposes.

The third protocol type defines a standard PPP packet. Implicitly, this may also contain an IP packet with full IP addressing. The standard only calls for recognizing the framing of such a packet and letting it pass transparently. One intention is to permit a vendor to provide a fairly dumb NIC (network interface card) which perhaps multiplexes IP packets from other boards of the system onto an Ethernet, but which does not need to assemble packets. The packet assembly and addressing can be done by the board of origin. (Note that a smarter NIC that can do IP packet assembly may choose to transport only the payload to other boards of the system using raw HDLC frames of the first protocol type.)

A vendor may choose to implement any or all of the three protocol types. When a packet device is said to conform to the MVIP packet standard, documentation with the device must additionally specify which protocol types are supported.

3 Hardware Requirements

A packet device must support either the MVIP-90 or HMVIP standard for connecting to the MVIP bus. If it has no MVIP switch, the MVIP bus timeslot or timeslots consumed by the packet channel must be stated in documentation for the device, including any configuration options to be set on installation. If the device has an MVIP switch, the packet channel should appear on the local bus side of the MVIP switch model. A packet channel with multiple timeslots must use consecutive timeslots on a single stream. When a packet device both uses an MVIP switch and consumes multiple timeslots for the packet channel, the MVIP switch must support FRAMED mode of connection. This ensures that all timeslots of the channel remain time aligned in passing through the switch.

4. Host Software Requirements

A resource packet device with no MVIP switch requires no host software. A packet device with an MVIP switch, but using only a single timeslot may have either an MVIP-90 or an MVIP-95 switching driver. A packet device with an MVIP switch and supporting a packet channel of multiple timeslots must have an MVIP-95 switching driver. Furthermore, that switching driver must support making multiple connections with a single SET_OUTPUT command in FRAMED mode. Any software above the driver level must use this particular command in establishing the packet channel connections.

5. Protocol Requirements

The following subsections describe three alternate protocols that may be followed on a packet channel. A given packet channel must use only one of the three protocols; alternating between protocol types on a single packet channel is not permitted.

For all three protocols, the way in which the HDLC frame is embedded in the MVIP timeslots is the same. An HDLC frame consists of an integral number of octets (8 bit entities) preceded and followed by one or more flag octets. The same flag octet may both follow one frame and precede the next. A bit stream is composed by taking the bits of each octet in turn in MSB to LSB order. Then the bits of the frame, but not the bits of the flag octets, are subjected to an operation called bit stuffing. After each five consecutive '1' bits in the frame, a '0' bit is inserted into the bit stream (regardless of whether the following bit is a '1' or '0'). This ensures that no set of 8 bits in the bit stream representing the frame appears as a flag octet. A frame may be of arbitrary length. The occurrence of the first non-flag octet following a flag octet marks the beginning of a frame. The occurrence of the first flag octet following the frame marks the end of the frame.

Note that because of flag insertion and bit stuffing, the actual data rate possible through a packet channel is somewhat less than that of the MVIP circuits over which it passes. In the worst case due to flag insertion, each octet is in its own packet and the rate is degraded by 50%. In the worst case due to bit stuffing (all '1's in very large packets), the rate is degraded by 20%. In practice, with fairly large packets of mixed data, the rate will typically be degraded by only a few percent.

The bit stream after bit stuffing is packed into MVIP timeslots by simply taking the next 8 bits of the stream and placing them in the timeslot in MSB to LSB order. Because of bit stuffing, the octets of a packet channel are not aligned with the MVIP timeslots. If a packet channel consists of multiple MVIP timeslots, those timeslots must be consecutive on a single MVIP stream. Furthermore, the packet channel is formed by stepping through the timeslots from least timeslot number to greatest timeslot number in a given TDM period (125 uS), and then jumping back to least timeslot number in the next TDM period, and so on. Each of the timeslots is then packed MSB to LSB as mentioned previously. A frame may start on any bit of such a multiple timeslot packet channel.

When establishing a packet channel connection, a packet receiver should not be supplied data from an MVIP timeslot which is tristated (not driven). The packet transmitter should be started and all MVIP connections established prior to starting the packet receiver. Alternately, pattern mode may be used on the MVIP switch for the packet receiver to assert a known data pattern prior to connecting the packet transmitter. The recommended pattern, in order to avoid a false frame when connecting the transmitter, is an octet of all '0' bits.

All three protocols may be used in a broadcast mode where there is a single source device of the packet stream but multiple destination devices. A destination device is free to accept or ignore a packet based either on addressing explicitly called out here in section 5.2, or based on the internal contents of the packet not specified in the standard.

In the diagrams of the protocols below, the octets are given from left to right in the time order in which they go over the stream. Bits of an octet are listed MSB to LSB from left to right. Entities composed of 2 octets have most significant octet first. And an asterisk stands for any number of octets including zero. The diagrams do not show bit stuffing.

5.1 Raw HDLC Frames

A raw HDLC frame is the simplest version of an HDLC frame and had the following format:

| Flag | Data Field | CRC-16 | Flag | Fill (Flag) or next |
|------|-----------|--------|------|---------------------|
| 0111 1110 | * | 2 Octets | 0111 1110 | Data Field |

Constant fill consisting of consecutive flag octets is required between frames. To minimize processing requirements in packet devices, the CRC-16 calculation can optionally be omitted in which case the CRC-16 bytes are to be set to zero. Due to constraints in many serial devices, the two octets for CRC-16 must be in the frame whether the calculation is made or not. A packet device claiming conformance to this protocol must have documentation additionally stating whether CRC-16 is generated on transmission or checked on reception. If the generation or checking of CRC-16 may be optionally enabled, the means of turning on and off generation or checking must also be documented. The size and use of the HDLC frame data field is totally arbitrary.

When used, the CRC-16 is to be calculated only from the octets of the Data Field using a standard cyclic redundancy check based the following polynomial:

$$CRC\text{-}16 = X^{16} + X^{15} + X^2 + 1$$

5.2 Addressed HDLC Frames

An addressed HDLC frame may be considered a specific type of raw HDLC frame and has the following format:

| Flag | Address | Control | Data Field | CRC-16 | Flag | Fill (Flag) or next Address |
|------|---------|---------|------------|--------|------|------------------------------|
| 0111 1110 | xxxx xxxx | ryyy zzzz | * | 2 Octets | 0111 1110 | |

This HDLC frame contains an additional two octets: an Address octet and a Control octet.

The Address octet is an arbitrary tag which will be used to multiplex multiple sessions over packet channels. The Address octet is used to identify a session number. It is preferred that this be used as an index from 1 to the maximum number of possible sessions configured for the particular channel. This permits up to 255 sessions over each packet channel. For example, a bonded MVIP channel of 32 timeslots (2 megabits) could support 128 GSM coded voice sessions sharing the link. An Address octet of zero is reserved for future purposes.

The Control octet will take the following assigned values for the 'yyy' field:

0 DATA—Contents of frame is data

Other values for the 'yyy' field are reserved for adding call setup control to this protocol type.

The 'r' field of the Control octet is a REQUEST/RESPONSE flag. It is reserved for the call setup control where a duplex channel (two packet channels in opposite directions) has been established between two endpoints. A setting of '0' is to be used for a command of type 'yyy' and a setting of '1' is to be used as a response to a command or to pass an asynchronous event or unsolicited status change. A DATA frame type ('yyy' set to 0) carrying data in the Data Field will always have the 'r' field set to '0' as well. On a duplex channel, a DATA frame type with an 'r' field set to '1' can be used to acknowledge the receipt of data packets in which case the Data Field will be empty.

The Control octet uses the 'zzzz' field as a sequence number for packet sequencing and acknowledgment control. This number is to cycle from 0 to 15 independently for each session (each different Address octet) and each 'yyy' field type in the Control octet. In particular, the DATA frame type may use the 'zzzz' field to track whether all frames are transmitted successfully. When the 'r' field is used as command response on a duplex channel, the 'zzzz' field in the response must be set to the 'zzzz' field of the corresponding command. In particular, responses to the DATA frame type may be used for flow control or for indication back to the transmitter that a frame has been missed by the receiver.

Constant fill consisting of consecutive flag octets is required between frames. To minimize processing requirements in packet devices, the CRC-16 calculation can optionally be omitted in which case the CRC-16 bytes are to be set to zero. Due to constraints in many serial devices, the two octets for CRC-16 must be in the frame whether the calculation is made or not. A packet device claiming conformance to this protocol must have documentation additionally stating whether CRC-16 is generated on transmission or checked or reception. If the generation or checking of CRC-16 may be optionally enabled, the means of turning on and off generation or checking must also be documented. The size and use of the HDLC frame data field is totally arbitrary.

When used, the CRC-16 is to be calculated from the Address, Control, and Data Field octets using a standard cyclic redundancy check based on the following polynomial:

$$CRC\text{-}16 = X^{16} + X^{15} + X^2 + 1$$

5.3 PPP Packets

A PPP packet may be considered a specific type of raw HDLC frame. The following material has been extracted from RFC 1549:

The Data Link Layer

PPP uses the principles, terminology, and frame structure of the International Organization For Standardization's (ISO) 3309-1979

High-level Data Link Control (HDLC) frame structure [2], as modified by "Addendum 1:

Start/stop transmission" [3], which specifies modifications to allow HDLC use in asynchronous environments.

The PPP control procedures use the definitions and Control field encodings standardized in ISO 4335-1979 [4] and ISO 4335-1979/Addendum 1-1979 [5]. PPP framing is also consistent with CCITT Recommendation X.25 LAPB [6], and CCITT Recommendation Q.922 [7], since those are also based on HDLC.

The purpose of this specification is not to document what is already standardized in ISO 3309. It is assumed that the reader is already familiar with HDLC, or has access to a copy of [2] or [6]. Instead, this document attempts to give a concise summary and point out specific options and features used by PPP.

To remain consistent with standard Internet practice, and avoid confusion for people used to reading RFCs, all binary numbers in the following descriptions are in Most Significant Bit to Least.

Significant Bit order, reading from left to right, unless otherwise indicated. Note that this is contrary to standard ISO and CCITT practice which orders bits as transmitted (network bit order). Keep this in mind when comparing this document with the international standards documents.

Frame Format

A summary of the PPP HDLC frame structure is shown below. This figure does not include start/stop bits (for asynchronous links), nor any bits or octets inserted for transparency. The fields are transmitted from left to right.

| Flag | Address | Control | Protocol | Information | Padding | FCS | Flag | Fill |
|---|---|---|---|---|---|---|---|---|
| 0111 1110 | 1111 1111 | 0000 0011 | 2 Octets | * | * | 2 Octets | 0111 1110 | (Flag) or next Address |

The Protocol, Information and Padding fields are described in the Point-to-Point Protocol Encapsulation [1].

Flag Sequence

The Flag Sequence indicates the beginning or end of a frame, and always consists of the binary sequence 01111110 (hexadecimal 0x7e).

The Flag Sequence is a frame separator. Only one Flag Sequence is required between two frames. Two consecutive Flag Sequences constitute an empty frame, which is ignored, and not counted as a FCS error.

Address Field

The Address field is a single octet and contains the binary sequence 11111111 (hexadecimal 0xff), the All-Stations address. PPP does not assign individual station addresses. The All-Stations address MUST always be recognized and received. The use of other address lengths and values may be defined at a later time, or by prior agreement. Frames with unrecognized Addresses SHOULD be silently discarded.

Control Field

The Control field is a single octet and contains the binary sequence 00000011 (hexadecimal 0x03), the Unnumbered Information (UI) command with the P/F bit set to zero. The use of other Control field values may be defined at a later time, or by prior agreement. Frames with unrecognized Control field values SHOULD be silently discarded.

Frame Check Sequence (FCS) Field

The Frame Check Sequence field is normally 16 bits (two octets). The use of other FCS lengths may be defined at a later time, or by prior agreement. The FCS is transmitted with the coefficient of the highest term first.

The FCS field is calculated over all bits of the Address, Control, Protocol, Information and Padding fields, not including any start and stop bits (asynchronous) nor any bits (synchronous) or octets (asynchronous or synchronous) inserted for transparency. This also does not include the Flag Sequences nor the FCS field itself.

For more information on the specification of the FCS, see ISO 3309 [2] or CCITT X.25 [6].

The end of the Information and Padding fields is found by locating the closing Flag Sequence and removing the Frame Check Sequence field.

Modification of the Basic Frame

The Link Control Protocol can negotiate modifications to the basic HDLC frame structure. However, modified frames will always be clearly distinguishable from standard frames.

Address-and-Control-Field-Compression

When using the default HDLC framing, the Address and Control fields contain the hexadecimal values 0xff and 0x03 respectively.

On transmission, compressed Address and Control fields are formed by simply omitting them.

On reception, the Address and Control fields are decompressed by examining the first two octets. If they contain the values 0xff and 0x03, they are assumed to be the Address and Control fields.

If not, it is assumed that the fields were compressed and were not transmitted.

By definition, the first octet of a two octet Protocol field will never be 0xff (since it is not even). The Protocol field value 0x00ff is not allowed (reserved) to avoid ambiguity when Protocol-Field-Compression is enabled and the first Information field octet is 0x03.

When other Address or Control field values are in use, Address-and-Control-Field-Compression MUST NOT be negotiated.

6. Connection Setup Recommendations

There are two forms of connection setup to be considered. The first, link layer setup, is fairly well defined by this proposal. The second, setup of sessions through the link layer, is either left to be defined later, or is outside this standard.

Link layer setup consists of the steps to make the required MVIP connections and to have two devices passing an HDLC bit stream over MVIP circuits. The result of this setup might be considered the HDLC stream passing consecutive flag octets prior to passing actual HDLC frames. In a typical case, the devices will use a single timeslot and be on different boards of a single MVIP system, each board containing an MVIP switch. In this case, any single timeslot of the MVIP bus may be chosen to carry the packet channel. A typical startup sequence would consist of: (1) start up the packet transmitter with a vendor specific procedure, (2) connect the local bus transmitter timeslot to the chosen MVIP bus timeslot using the SET_OUTPUT command to the MVIP switch on the transmitter board, (3) connect the chosen MVIP bus timeslot to the local bus receiver timeslot using the SET_OUTPUT command to the MVIP switch on the receiver board, and (4) start up the packet receiver with a vendor specific procedure.

If a multiple timeslot packet channel is being set up, the procedure is the same except that a contiguous set of timeslots must be chosen on the MVIP bus, and the SET_OUTPUT commands to the MVIP switches must apply to all timeslots at once, and must specify FRAMED mode. If a duplex channel is being set up, the procedure above must be followed twice, once for each direction. If a multi-chassis connection is being set up, timeslots must be chosen on the local MVIP bus within each chassis, and on the multi-chassis MVIP bus between them. Then four instead of two MVIP switch commands are used, two on each chassis, to establish the complete connection. Note that multiple timeslot packet channels over multi-chassis MVIP requires that the multi-chassis MVIP board support FRAMED mode connections.

For the raw HDLC frame protocol type, further connection setup is outside this standard. A vendor is free to define how further control information is to be embedded in the Data Field of the frame to effect or assist in this setup.

For the addressed HDLC frame protocol type, further connection setup is intended to make use of additional values of the 'yyy' field in the Control octet which have not yet been defined by this proposal. Values may be explicitly defined prior to this proposal becoming a standard. Any additional values not so defined are to remain reserved for future revisions of the standard. This further connection setup may consist of both procedures for establishing a session (sub-channel) on the link (packet channel), and procedures for doing call setup through an established session.

For the PPP packet protocol type, further connection setup is outside this standard, but may be specified in additional public standards defining what is embedded in the packet.

7. Hardware Implementation Recommendations

There are many devices on the market which might assist in compliance with this standard. Those that are mentioned here are recommended for being well matched to the requirements. However, as long as the descriptions in sections 3 through 5 of this document are followed, any hardware implementation is acceptable.

Since this standard is an overlay to the MVIP standard, hardware interfacing to the MVIP bus is required. The FMIC integrated circuit available from Mitel is particularly convenient for interfacing to a full MVIP-90 bus with a single device. The local bus streams from this device may connect directly to serial streams of the other devices listed below.

The 82525 or 82526 HSCX integrated circuits from Siemens are HDLC controllers convenient for forming a packet channel through one MVIP bus timeslot. Serial input and output pins of the HSCX may connect directly to local bus pins of the FMIC mentioned above. Additional frame strobes asserted by the FMIC can be used by the HSCX to select which of the timeslots in a stream is to be used.

The Motorola 68360 is a communications processor capable of handling multiple packet channels or of bonding multiple MVIP timeslots into a single high bandwidth packet channel. Special internal hardware features of the processor assist in handling HDLC data including bit stuffing and removal.

Many digital signal processors (DSPs) have high speed serial ports which may run at MVIP stream rates. For instance, the Texas Instruments TMS320C54x series processors have serial ports which additionally support autobuffering into a large circular buffer. While general purpose DSPs typically do not have the additional hardware to assist in the HDLC specific operations like bit stuffing, they have enough raw processing power to handle large data rates and the flexibility to handle multiple timeslot packet channels. A DSP which is needed for other functions in an application may prove quite useful in supporting a packet channel as well.

The foregoing discussion discloses and describes merely exemplary methods and embodiments of the present invention. As will be understood by those familiar with the art, the invention may be embodied in other specific forms without departing from the spirit or essential characteristics thereof. For example, other network cards such as the ones described could be used to attach to the computer network, such as cards using the Asynchronous Transfer Mode (ATM) protocol. Also, incoming connections from the PSTN are not limited to T1 connections. Further DSP processing features of the vocoder board linked via a bus could be implemented, such as data encryption, and these would not have to be performed by the host CPU. Accordingly, the disclosure of the present invention is intended to be illustrative, but not limiting, of the scope of the invention, which is set forth in the following claims.

What is claimed is:

1. A system for connecting telephony equipment to computer network equipment, comprising:
    a telephony interface module configured to accept at least one telephony connection from a telephony network,
    a computer network interface module configured to accept at least one data connection from a computer network,
    a signal processing module configured to alter voice data to be transferred to the computer network interface module from the telephony interface module into packets of digitized voice data and send the packets of digitized voice data in real time with low latency, and
    a bypass mechanism configured to transfer the voice data between the telephony interface module, the computer network interface module, and the signal processing module in real time with low latency while bypassing a host processor connected to the telephony interface module, the computer network interface module, and the signal processing module, and while bypassing a host processor memory associated with the host processor.

2. The system of claim 1 wherein the bypass mechanism is a time division multiplexed bus.

3. The system of claim 1 wherein the bypass mechanism is infinitely scalable.

4. The system of claim 1 wherein the bypass mechanism allows different hierarchical levels of switching.

5. The system of claim 1 wherein the bypass mechanism is constructed and adapted to carry compressed voice information sent in real-time with low-latency.

6. The system of claim 1 wherein the telephony interface module is part of a telephony interface board, wherein the computer network interface module is part of a computer network interface board, and wherein the signal processing module is part of a signal processing board.

7. The system of claim 1 further including further telephony interface modules, further computer network interface modules, and further signal processing modules connected to the bypass mechanism.

8. The system of claim 1 wherein the system is constructed and adapted to handle 24 simultaneous, full-duplex telephony channels.

9. The system of claim 1 wherein the signal processing circuit includes a DSP processor.

10. The system of claim 1 wherein the host processor is based on commodity computer technology.

11. The system of claim 1 wherein the host processor is a processor of a personal computer.

12. The system of claim 1 wherein the bypass mechanism is separate from a bus of the host computer to which each of the telephony interface module, the computer network interface module, and the signal processing module are electrically connected.

13. The system of claim 12 wherein the bus of the host processor is one of either the ISA/EISA or MCA busses.

14. The system of claim 1 wherein the bypass mechanism is a PCI bus.

15. The system of claim 1 wherein the bypass mechanism includes a packet channel passing through a time division multiplexed bus.

16. The system of claim 15 wherein the time division multiplexed bus is designed according to the MVIP standard.

17. A method of transmitting data from telephony equipment to computer network equipment, comprising:
    providing at least one telephony connection from a telephony network to a telephony interface module,
    providing at least one data connection from a computer network to a computer network interface module,
    processing voice data to be transferred between the computer network interface module and the telephony interface module, the processing including determining whether to alter the voice data to be transferred, and altering, if desired, the voice data to be transferred into packets of digitized voice data, and
    transferring the packets of digitized voice data between the telephony interface module, the computer network interface module, and the signal processing module in real time with low latency while bypassing a host processor connected to the telephony interface module, the computer network interface module, and the signal processing module, and while bypassing a host processor memory associated with the host processor.

18. The method of claim 17 wherein the transferring is time division multiplexed.

19. The method of claim 17 wherein the transferring includes carrying compressed voice information sent in real-time with low-latency.

20. The method of claim 17 wherein the transferring bypasses a host processor that is based on commodity computer technology.

21. The method of claim 17 wherein the transferring bypasses a host processor that is a processor of a personal computer.

22. The method of claim 17 wherein the transferring transfers a packet channel through a time division multiplexed bus.

23. A system comprising:
    a telephony interface module for accepting at least one telephony connection from a telephony network,
    a computer network interface module for accepting at least one data connection from a computer network, means for processing voice data to be transferred between the computer network interface module and the telephony interface module, the processing including determining whether to alter the voice data to be transferred, and altering, if desired, the voice data to be transferred into packets of digitized voice data, and means for transferring the voice data between the telephony interface module, the computer network interface module, and the means for processing data, in real time with low latency while bypassing a host processor connected to the telephony interface module, the computer network interface module, and the means for processing data, and while bypassing a host processor memory associated with the host processor.

24. The system of claim 23 wherein the means for transferring data includes a time division multiplexed bus.

25. The system of claim 24 wherein the means for transferring data is separate from a bus of the host computer to which each of the telephony interface module, the computer network interface module, and the means for processing data is electrically connected.

26. The system of claim 25 wherein the means for processing is adapted to compress the voice data and the means for transferring data is adapted to carry data streams including compressed voice information sent in real-time with low-latency.

27. The system of claim 26 wherein the host processor is a processor of a personal computer.

28. The system of claim 24 wherein the means for transferring data is adapted to transfer a packet channel through the time division multiplexed bus.

* * * * *